(12) United States Patent
Phadke et al.

(10) Patent No.: US 7,719,812 B2
(45) Date of Patent: May 18, 2010

(54) POWER CONVERTERS WITH RATE OF CHANGE MONITORING FOR FAULT PREDICTION AND/OR DETECTION

(75) Inventors: Vijay Phadke, Pasig (PH); Gordon Currie, Quezon (PH); Arlaindo Asuncion, Parañaque (PH)

(73) Assignee: Astec International Limited, Kwun Tong, Kowloon (HK)

( * ) Notice: Subject to any disclaimer, the term of this patent is extended or adjusted under 35 U.S.C. 154(b) by 304 days.

(21) Appl. No.: 11/803,708

(22) Filed: May 15, 2007

(65) Prior Publication Data

US 2008/0285192 A1   Nov. 20, 2008

(51) Int. Cl.
*H02H 3/08* (2006.01)
*H02H 5/04* (2006.01)
(52) U.S. Cl. ..................... 361/93.1; 361/93.8
(58) Field of Classification Search ............ 361/93.1, 361/93.8, 79
See application file for complete search history.

(56) References Cited

U.S. PATENT DOCUMENTS

| | | | |
|---|---|---|---|
| 3,458,795 A * | 7/1969 | Ainsworth | 363/10 |
| 4,896,089 A | 1/1990 | Kliman et al. | |
| 5,455,736 A | 10/1995 | Nishiyama et al. | |
| 5,561,610 A | 10/1996 | Schricker et al. | |
| 5,656,765 A | 8/1997 | Gray | |
| 5,786,641 A | 7/1998 | Nakanishi et al. | |
| 5,950,147 A | 9/1999 | Sarangapani et al. | |
| 6,119,074 A | 9/2000 | Sarangapani | |
| 6,121,886 A | 9/2000 | Andersen | |
| 6,275,958 B1 | 8/2001 | Carpenter et al. | |
| 6,363,332 B1 | 3/2002 | Rangarajan et al. | |
| 6,424,930 B1 | 7/2002 | Wood | |
| 6,437,963 B1 | 8/2002 | Hamilton et al. | |
| 6,807,507 B2 | 10/2004 | Kumar et al. | |
| 6,880,967 B2 | 4/2005 | Isozumi et al. | |
| 7,003,409 B2 | 2/2006 | Hepner et al. | |
| 7,016,825 B1 | 3/2006 | Tyron, III | |
| 7,050,396 B1 | 5/2006 | Cohen et al. | |
| 7,254,514 B2 | 8/2007 | House et al. | |
| 7,424,396 B2 | 9/2008 | Dodeja et al. | |
| 7,456,618 B2 * | 11/2008 | Jain et al. | 323/272 |
| 2005/0030772 A1 | 2/2005 | Phadke | |
| 2005/0219883 A1 | 10/2005 | Maple et al. | |
| 2006/0273595 A1 | 12/2006 | Avagliano et al. | |
| 2007/0103163 A1 | 5/2007 | Hachisuka et al. | |
| 2008/0141072 A1 | 6/2008 | Kalgren et al. | |
| 2008/0157742 A1 * | 7/2008 | Martin et al. | 323/284 |
| 2008/0215294 A1 * | 9/2008 | Rosner et al. | 702/184 |

OTHER PUBLICATIONS

"Influence of aging on electrolytic capacitors function in static converters: Fault prediction method," P. Venet, A. Lahyani, G. Grellet and A. Ah-Jaco; The European Physical Journal 1999; pp. 71-83.

* cited by examiner

*Primary Examiner*—Ronald W Leja
(74) *Attorney, Agent, or Firm*—Harness, Dickey & Pierce, P.L.C.

(57) ABSTRACT

A power converter includes a controller having at least one input for monitoring a rate of change of an operating parameter of the power converter. The controller is configured for comparing the monitored rate of change of the operating parameter with an allowable rate of change for the operating parameter, and for generating a fault signal when the monitored rate of change of the operating parameter deviates from the allowable rate of change for the operating parameter. The operating parameter for which the rate of change is monitored may be, for example, a temperature, a current and/or a voltage in the power converter.

30 Claims, 4 Drawing Sheets

POWER CONVERTERS WITH RATE OF CHANGE MONITORING FOR FAULT PREDICTION AND/OR DETECTION

FIELD

The present disclosure relates to detecting and/or predicting faults in power converters, including AC/DC and DC/DC power converters.

BACKGROUND

The statements in this section merely provide background information related to the present disclosure and may not constitute prior art.

A wide variety of power converters are known in the art for converting electric power from one form to another, including AC/DC and DC/DC power converters. These power converters commonly include one or more controllers that, among other things, monitor critical parameters such as input current, output current and/or temperature. When an overcurrent or over-temperature condition is detected, the controller can generate a fault signal and/or shutdown the power converter to prevent or minimize damage to the power converter and any system hosting the power converter (e.g., a computer or automotive system). Although these known approaches to fault detection are useful, the present inventors have recognized a need for improvements in detecting fault conditions.

SUMMARY

According to one aspect of the present disclosure, a power converter includes a controller having at least one input for monitoring a rate of change of an operating parameter of the power converter. The controller is configured for comparing the monitored rate of change of the operating parameter with an allowable rate of change for the operating parameter, and for generating a fault signal when the monitored rate of change of the operating parameter deviates from the allowable rate of change for the operating parameter.

According to another aspect of this disclosure, a power converter includes a controller having at least one input for monitoring a rate of change of a temperature in the power converter. The controller is configured for comparing the monitored rate of temperature change with an allowable rate of temperature change, and generating a fault signal when the monitored rate of temperature change deviates from the allowable rate of temperature change.

According to yet another aspect of this disclosure, a power converter includes a controller having at least one input for monitoring a rate of current change in the power converter. The controller is configured for determining whether the monitored rate of current change is abnormal, and generating a fault signal after determining the monitored rate of current change is abnormal.

According to still another aspect of this disclosure, a method is provided for predicting a fault in a power converter. The method includes monitoring a rate of change of an operating parameter of the power converter, determining whether the monitored rate of change of the operating parameter is abnormal, and providing a fault signal after determining the monitored rate of change of the operating parameter is abnormal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
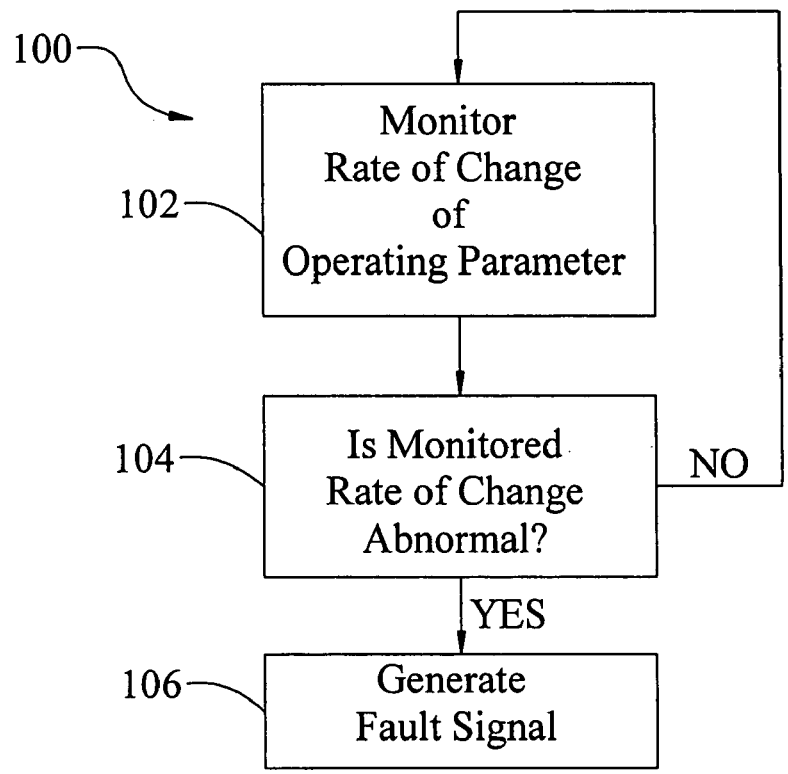
FIG. 1 is flow diagram of a method of monitoring the rate of change of an operating parameter according to one example of the present disclosure.

A method of predicting a fault in a power converter according to one aspect of the present disclosure is indicated generally by reference number 100 in FIG. 1. As shown in FIG. 1, the method 100 includes, at step 102, monitoring a rate of change of an operating parameter of the power converter. At step 104, a determination is made as to whether the monitored rate of change of the operating parameter is abnormal. If the monitored rate of change of the operating parameter is not abnormal, the method 100 reverts back to step 102, as shown in FIG. 1. If, instead, the monitored rate of change of the operating parameter is determined to be abnormal in step 104, the method 100 continues to step 106 and a fault signal is generated.

The fault signal generated at step 106 may be used to activate a visual or audible alarm, and/or may be provided to a system hosting the digital power converter. Additionally, or in the alternative, the digital power converter may be configured to shut down in response to the fault signal generated at step 106. In this manner, faults in the digital power converter may be detected or predicted by monitoring the rate of change of a critical parameter, either instead of or in addition to monitoring the instantaneous value of the operating parameter to determine whether a threshold (e.g., a minimum or maximum allowable value) has been reached. Accordingly, a warning signal can be provided to a user and/or to a system hosting the digital power converter, and/or the digital power converter can be shut down, upon detecting an abnormal rate of change of a critical parameter, even before a threshold for the instantaneous value of such parameter is reached. In other words, monitoring the rate of change of a critical parameter in the digital power converter can result in an earlier detection or prediction of faults as compared to simply detecting when the instantaneous value of such parameter has reached a threshold value.

With further reference to step 104 in FIG. 1, there are numerous possible ways of determining whether the monitored rate of change of the operating parameter is abnormal. For example, the monitored rate of change can be compared to an allowable rate of change (which may be defined as a range of allowable rates of change) to determine whether the monitored rate of change deviates from the allowable rate. Alternatively, if the operating parameter that is monitored is expected to change in only a linear fashion, the monitored rate of change can be deemed abnormal when the monitored operating parameter changes in a non-linear fashion (or vice versa). Other approaches can also be employed for determining whether the monitored rate of change for the operating parameter is abnormal without departing from the scope of the present disclosure.

Figure 2:
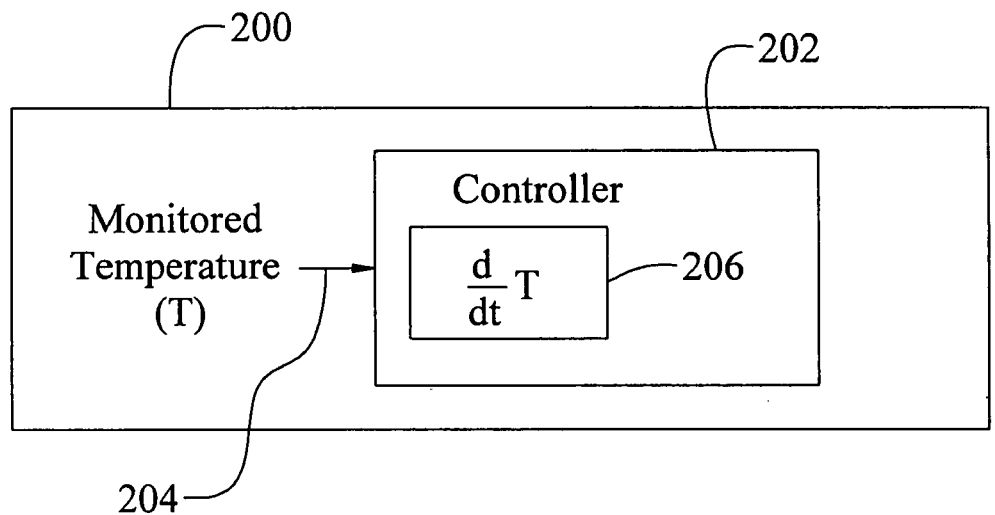
FIG. 2 is a block diagram of a power converter configured to monitor the rate of change of a temperature.

FIG. 2 illustrates a power converter 200 having a (digital or analog) controller 202. The controller 202 includes at least one input 204 for monitoring the rate of change of a temperature. As shown in FIG. 2, the rate of temperature change is determined by applying a derivative function 206 to the monitored temperature. In this particular example, the controller 202 compares the monitored rate of temperature change to an allowable rate of change for such temperature. The allowable rate of temperature change may be a predetermined value, or alternatively, may depend on other operating conditions of the power converter 200 such as ambient temperature, temperatures at other locations in the power converter, load conditions, input conditions, etc. If the controller 202 determines that the monitored rate of temperature change is abnormal, the controller 202 can send a fault signal to a system hosting the power converter 200 and/or shut down the power converter 200 immediately or after a predetermined amount of time. The monitored temperature shown in FIG. 2 can be any critical temperature in the power converter 200, such as the temperature of a particular component such as an integrated circuit, a capacitor, etc.

When the power converter 200 is operating normally, the rate of temperature change at a specific location in the power converter 200 may depend upon several factors such as the load, input conditions, operating temperature, airflow, etc. Because these factors are known, the rate of rate of temperature change is predictable. For example, if the power converter 200 is operating at 10% of the rated output power and the load is increased to 50%, the temperature of a critical power component will start to rise predictably. However, if the power converter 200 is not operating normally (e.g., because of a fan failure or blockage, or the failure of a redundant part, or the failure of a control circuit, etc.), the temperature will start to rise at a different rate, even if the load is not increased. The controller 202 is configured to identify this abnormal rate of temperature change and advise the system hosting the power converter 200 of an impending failure. In response, the system may reduce the load or take other appropriate action.

Figure 3:
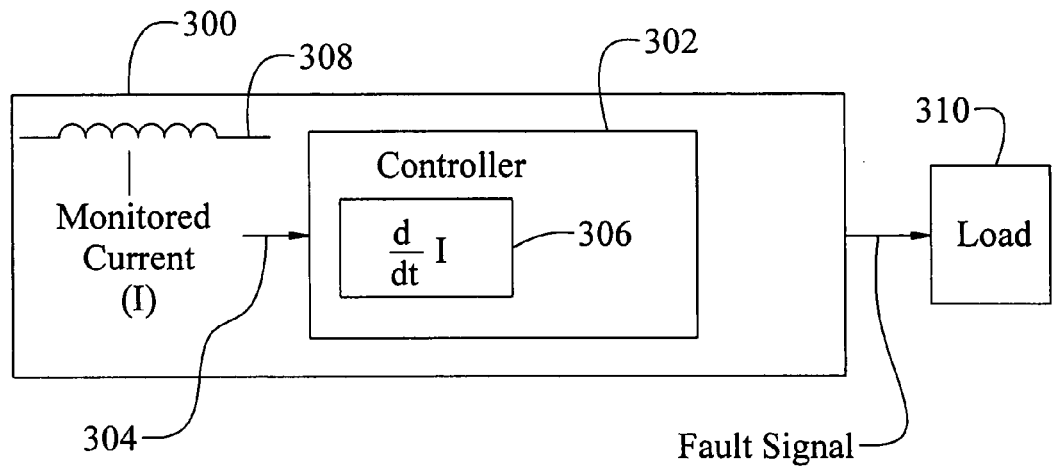
FIG. 3 is a block diagram of a power converter configured to monitor the rate of change of a current.

FIG. 3 illustrates another example of a power converter 300 having a controller 302. The controller 302 includes at least one input 304 for monitoring the rate of change of a current in the power converter 300. The rate of change of the monitored current is determined by applying a derivative function 306 to the monitored current, as shown in FIG. 3.

The controller 302 can determine whether the monitored rate of current change is abnormal by comparing the monitored rate of change with an allowable rate of change. The allowable rate of change (which can be defined as a range of allowable rates of change) can be predetermined. Alternatively, the allowable rate of change may depend on operating conditions of the power converter 300 such as the operating duty cycle, the output voltage, start-up conditions, steady state operation, etc. It should be understood, however, that other approaches can be employed for determining whether the monitored rate of current change is abnormal. For example, if the monitored current is a current through a coil 308 (such as an inductor or a transformer winding) as shown in FIG. 3, changes in the monitored current should be linear. In other words, the rate of current change in an inductor or transformer winding should be constant. Therefore, the controller 302 can determine whether the monitored rate of current change is abnormal by determining whether the monitored rate of change is constant. If the monitored rate of current change in the coil 308 is not constant, the controller 302 can generate a fault signal. Optionally, the fault signal generated by the controller 302 can be provided to a load 310 supplied by the power converter 300, as shown in FIG. 3.

As another example, suppose the maximum rate of rise in the output current during normal operation of the converter 300 is five amperes per microsecond. If the controller 302 detects a higher rate of rise, such as fifty amperes per microsecond, the controller 302 can interpret this as an advance warning of a short circuit or extreme overload, even before reaching a maximum instantaneous current threshold. In that event, the controller 302 can shut down the power converter 300 in an effort to minimize damage to the converter 300 and/or the load supplied by the converter 300.

Further, the rate of rise of a voltage in the power converter 300 may depend on active and/or passive parts as well as the power architecture, but is nevertheless predictable. Thus, as an alternative (or in addition) to monitoring the rate of rise of a current, the controller 302 can be configured to monitor the rate of rise of a voltage. As an example, if the controller 302 determines that the rate of change in the output voltage is greater than the rate of change during transient load conditions, which may indicate an open loop condition, the controller 302 can shut down the power converter 300 in an effort to minimize damage to the converter 300 and/or the load supplied by the converter 300.

Figure 4:
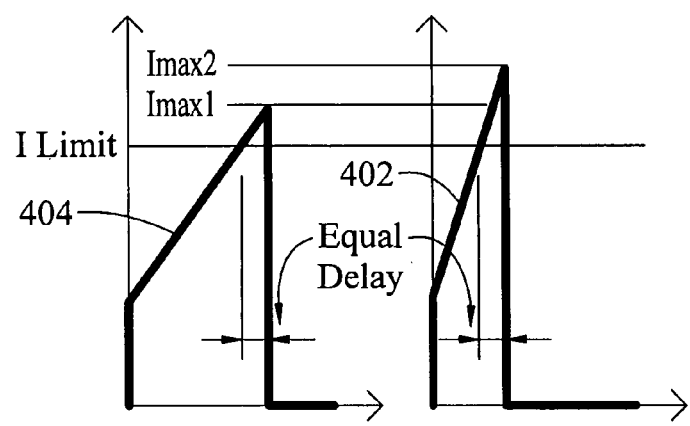
FIG. 4 illustrates an overcurrent condition for two output currents having different rates of rise (slopes).

FIG. 4 illustrates how monitoring the instantaneous value of a critical parameter, by itself, may provide insufficient protection in a power converter. In the example of FIG. 4, two output currents are shown. The output current 402 (on the right in FIG. 4) is shown rising at a faster rate than the output current 404 (on the left in FIG. 4). A conventional power converter will typically monitor the instantaneous value of the output current and shut down if the output current exceeds a threshold limit $I_{limit}$. However, the detection cycle typically includes a propagation delay. In other words, the power converter may require a finite amount of time to detect and respond to an excessive output current. As shown in FIG. 4, by the time the power converter detects and responds to the output current 404 exceeding the threshold limit $I_{limit}$, the output current 404 has reached the level $I_{max1}$. In contrast, by the time the power converter detects and responds to the output current 402 exceeding the threshold limit $I_{limit}$, the output current 402 has reached the level $I_{max2}$. This is because the rate of rise of the output current 402 is greater than the rate of rise of the output current 404. However, by monitoring the rate of rise of the output current, the power converter can detect and respond to a fault condition even before the threshold limit $I_{limit}$ is reached, resulting in less abuse of the power converter and any load supplied by the power converter. Although FIG. 4 illustrates this point in the context of output current, the same can be said for any critical parameter of the power converter including other currents, temperatures, voltages, etc.

Figure 5:
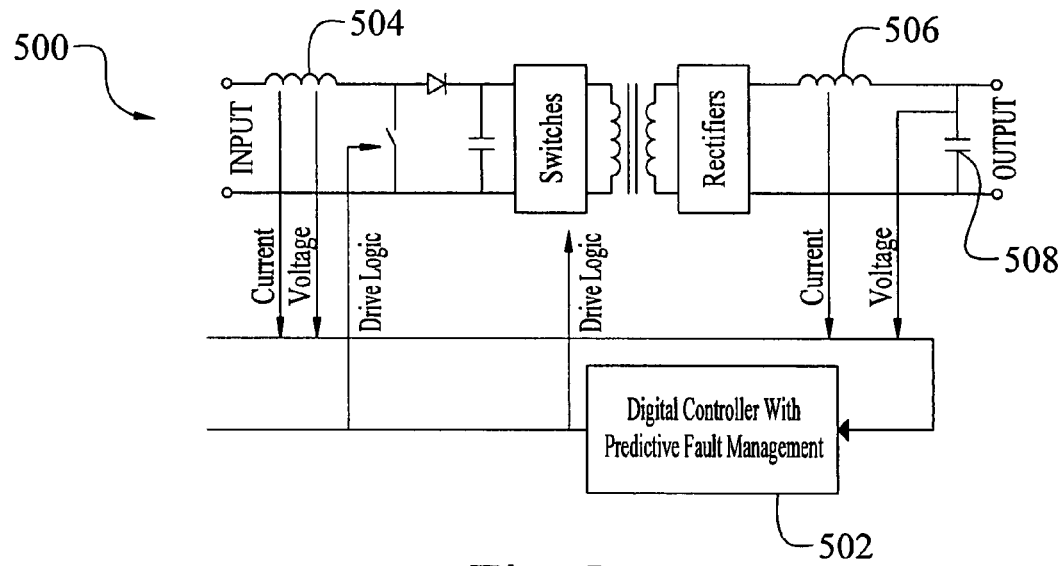
FIG. 5 is a block diagram of a power converter configured to monitor its overall efficiency.

FIG. 5 illustrates a power converter 500 according to another example of the present disclosure. As shown therein, the power converter 500 includes a controller 502 that is configured to monitor the overall efficiency of the power converter 500. In this manner, the controller 502 can generate a fault signal upon detecting an efficiency degradation. In response to the generated fault signal, the power converter 500 can optionally reduce the operating load by sacrificing some functionality until proper servicing action is taken. The generated fault signal can also prompt part or system replacement.

More specifically, the power converter 500 includes an input choke 504, an output inductor 506 and an output capacitor 508. The controller 502 includes inputs for monitoring the input current through the input choke 504, and the input voltage provided to the choke 504. Additionally, the controller is configured to monitor the output current through the output inductor 506, as well as the output voltage across the output capacitor 508. In this manner, the controller 502 can calculate the input power, the output power, and thus the overall efficiency of the power converter 500. Upon determining that the efficiency of the power converter 500 has dropped by more than a predetermined amount, the controller 502 can generate a fault signal.

In one embodiment, the controller 502 includes a look up table of efficiencies for the power converter 500 under normal operating conditions and various loads, input line conditions and operating temperatures. The power converter 500 may include, for example, parallel power devices or components (such as parallel rectifier devices) for reducing losses. When such a device or component fails, the power converter 500 may continue to operate but at a reduced efficiency. By monitoring the operating efficiency of the power converter 500 and comparing the monitored efficiency with one or more values in the lookup table, the controller 502 can detect the component failure and, for example, provide a fault signal to the system hosting (i.e., receiving power from) the power converter 500.

Figure 6:
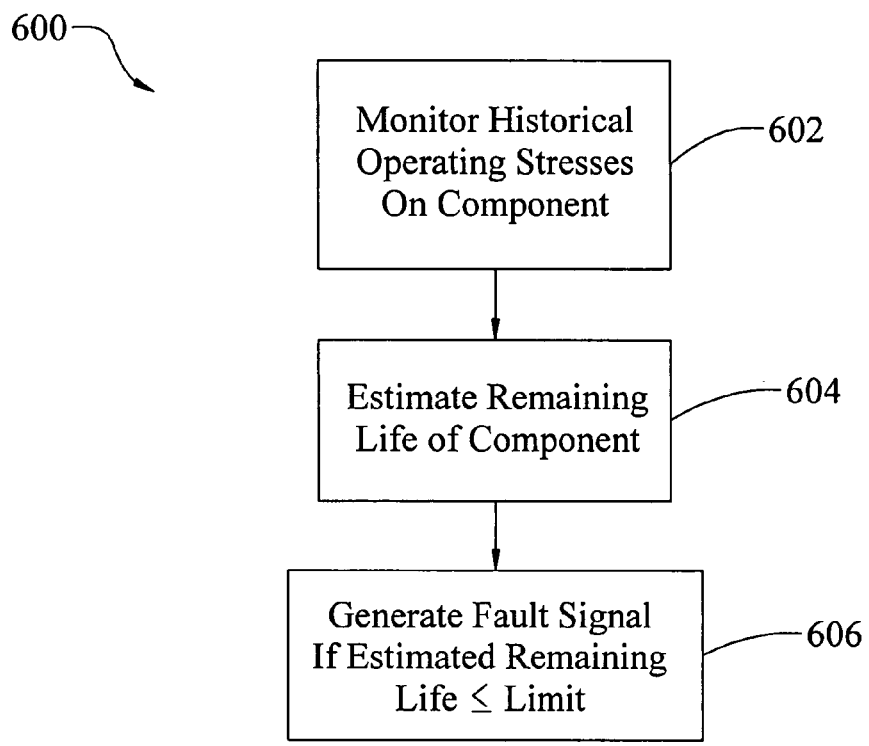
FIG. 6 is a flow diagram of a method of estimating the remaining life of a component based on monitored historical stress on the component.

FIG. 6 is a block diagram of a method for predicting the fault of a component in a power converter (or other device or system) according to another aspect of the present disclosure. As shown in FIG. 6, the method 600 includes the step 602 of monitoring historical operating stresses on a component. The stresses may include voltage, current and/or temperature fluctuations over time. In step 604, the expected remaining life of the component is estimated. If the estimated remaining life of the component is less than a predetermined value, a fault signal is generated in step 606, as shown in FIG. 6. In this manner, the component can be replaced near the end of its expected life, before the component fails. Further, because many manufacturers are conservative when estimating the expected life of a component. This, in turn, results in many users replacing the component prematurely. By using the method 600 of FIG. 6, such premature placement of parts and/or systems can be avoided, resulting in savings. Similarly, the use of redundant parts can be minimized or eliminated, resulting in further savings.

Figure 7:
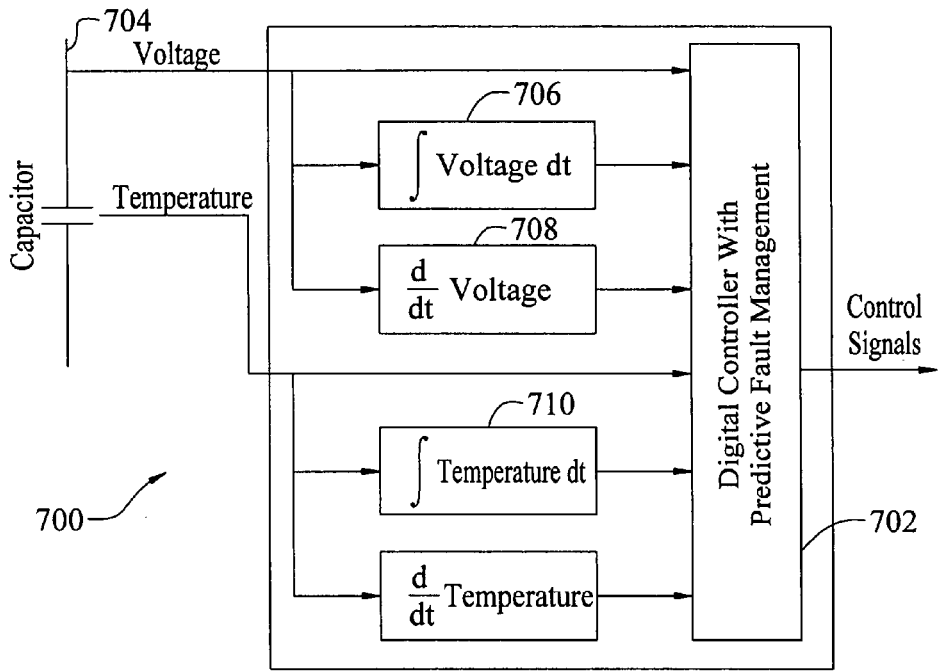
FIG. 7 is a block diagram of a power converter configured to estimate the remaining life of an electrolytic capacitor.

FIG. 7 illustrates a power converter 700 having a controller 702 and an electrolytic capacitor 704. As shown in FIG. 7, the controller 702 is configured to monitor the ambient or case temperature of the capacitor 704, as well the voltage and current stresses on the capacitor 704. In particular, the controller 702 is configured to monitor the voltage stresses on the capacitor 704 by applying an integration function 706 to the monitored voltage. The controller 702 is configured to monitor the current stresses on the capacitor 704 by applying a derivative function 708 to the monitored voltage (which enables the controller to calculate the current stresses, since the value of the capacitor 704 is known). Likewise, the controller 702 is configured to monitor the temperature stresses on the capacitor 704 by applying an integration function 710 to the monitored temperature. Using the monitored voltage, current and temperature stresses on the capacitor 704, as well as stored data for the capacitor 704, the controller 702 can estimate the expected remaining life of the capacitor 704 quite accurately.

Additionally, in the particular example of FIG. 7, the controller 702 is also configured to monitor the instantaneous voltage and temperature across the capacitor, as well as the rate of change of such temperature and voltage, for detecting and/or predicting faults of the capacitor 704.

Alternatively (or additionally), the controller 702 can be configured for monitoring operating stresses on a fan to predict its remaining useful life. For example, the life of a fan can depend upon the applied voltage and ambient operating temperatures. Typically, a specific operating temperature profile is expected for a given season and load profile. Components are selected to meet these requirements over the expected operating life of the fan. These conditions may change in the field, however, and reduce the useful life of the fan. In various embodiments, the controller 702—which, like the other controllers disclosed herein, may be a microprocessor—can periodically sample the operating temperature, fan voltage and fan speed. Using this data, the controller 702 can calculate the remaining expected life of the fan using a stored formula. When the remaining fan life is determined to be lower than the expected life stored in memory, the controller 702 can provide a fault signal to the system hosting the power converter 700.

Figure 8:
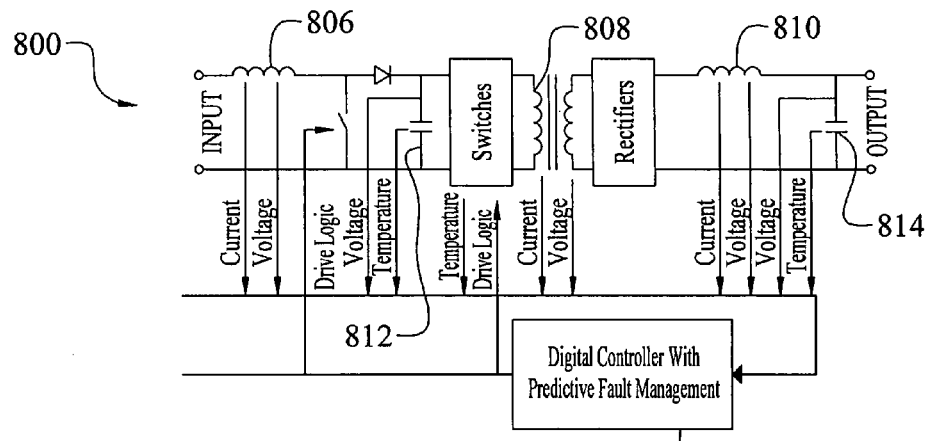
FIG. 8 is a block diagram of a power converter configured to monitor its overall efficiency, to monitor the rate of change of several operating parameters, and to estimate the remaining life of multiple components.

FIG. 8 illustrates a power converter 800 having a controller 802 that is configured to implement several aspects of the present disclosure. In particular, the controller 802 is configured to monitor the input power and output power of the converter 800 for the purpose of monitoring and detecting changes in the overall efficiency of the power converter 800. Further, the controller 802 is configured to monitor the rate of current change in the input inductor 806 a primary winding 808, and an output inductor 810. Further still, the controller 802 is configured to monitor the rate of temperature change in the electrolytic capacitors 812, 814, and is also configured to monitor historical current, voltage and/or temperature stresses on such capacitors 812, 814 for the purpose of estimating the expected remaining life of these components. Upon detecting a degradation in the overall efficiency of the converter, or an abnormal rate of change in one of the monitored temperatures, currents or voltages, or determining that the expected remaining life of a component is less than a threshold value, the controller generates a corresponding fault signal. This fault signal can be provided by the controller 802 to a load supplied by the power converter (i.e., a system hosting the power converter, such as a computer system), used to activate an alarm, and/or cause the controller 802 to shut down or alter the functionality of the power converter 800 as necessary or desired.

Although several aspects of the present invention have been described above with reference to power converters, it should be understood that various aspects of the present disclosure are not limited to power converters, and can be applied to a variety of other systems and applications including, without limitation, electric motors, automotive systems, and other types of electronic or electromechanical systems used in automotive, motor control or general industry.

By implementing any or all of the teachings described above, a number of benefits and advantages can be attained including improved system reliability, reduced system down time, elimination or reduction of redundant components or

What is claimed is:

1. A power converter comprising a controller having at least one input for monitoring a rate of change of a temperature in the power converter, the controller configured for comparing the monitored rate of temperature change with an allowable rate of temperature change, and generating a fault signal when the monitored rate of temperature change deviates from the allowable rate of temperature change.

2. The power converter of claim 1 further comprising an electrolytic capacitor, wherein said temperature is an operating temperature of the electrolytic capacitor.

3. The power converter of claim 1 further comprising a fan, wherein said temperature is an operating temperature of the fan.

4. The power converter of claim 1 wherein the controller is configured to monitor an instantaneous value of said operating temperature and the rate of change of said temperature.

5. The power converter of claim 1 wherein the controller is configured for monitoring a rate of change of each of a plurality of temperatures in the power converter, comparing the monitored rate of change of each temperature with an allowable rate of change for such temperature, and generating a fault signal when one or more of the monitored rates of change deviates from its allowable rate of change.

6. The power converter of claim 1 wherein the controller is configured for determining the allowable rate of change for the temperature as a function of one or more operating conditions of the power converter.

7. The power converter of claim 1 wherein the controller is configured for providing the fault signal to a system hosting the power converter.

8. The power converter of 7 wherein the controller is configured for shutting down the power converter in response to a command from the system hosting the power converter.

9. The power converter of claim 1 wherein the controller is configured for shutting down the power converter after generating the fault signal.

10. The power converter of claim 1 wherein the controller is further configured for monitoring the rate of change of each of a plurality of operating parameters, comparing the monitored rate of change of each operating parameter with an allowable rate of change for such operating parameter, and generating a fault signal when one or more of the monitored rates of change deviates from its allowable rate of change.

11. The power converter of claim 10 wherein the plurality of operating parameters are selected from the group consisting of temperatures, currents and voltages.

12. A method of predicting a fault in a power converter, the method comprising: monitoring a rate of change of an operating parameter of the power converter; determining whether the monitored rate of change of the operating parameter is abnormal; and providing a fault signal after determining the monitored rate of change of the operating parameter is abnormal, wherein determining includes determining whether the monitored rate of change of the operating parameter is substantially linear.

13. A power converter comprising an output stage and a controller having at least one input for monitoring a rate of current change in the power converter, the controller configured for determining whether the monitored rate of current change is abnormal by comparing the monitored rate of current change with an allowable rate of current change, and generating a fault signal after determining the monitored rate of current change is abnormal, wherein the output stage includes a sense resistor and said current is a current in the sense resistor.

14. The power converter of claim 13 wherein the allowable rate of current change is defined as a range of allowable rates of change.

15. The power converter of claim 13 wherein the controller is configured for determining the allowable rate of current change as a function of one or more operating conditions of the power converter.

16. The power converter of claim 13 wherein the controller is configured for providing the fault signal to a system hosting the power converter.

17. The power converter of 16 wherein the controller is configured for shutting down the power converter in response to a command from the system hosting the power converter.

18. The power converter of claim 13 wherein the controller is configured for shutting down the power converter after generating the fault signal.

19. The power converter of claim 13 wherein the controller is further configured for monitoring the rate of change of each of a plurality of operating parameters, comparing the monitored rate of change of each operating parameter with an allowable rate of change for such operating parameter, and generating a fault signal when one or more of the monitored rates of change deviates from its allowable rate of change.

20. The power converter of claim 19 wherein the plurality of operating parameters are selected from the group consisting of temperatures, currents and voltages.

21. A power converter comprising a coil, and a controller having at least one input for monitoring a rate of current change in the coil, and the controller is configured for determining whether the monitored rate of current change in the coil is abnormal by determining whether the monitored rate of current change in the coil is substantially linear, and generating a fault signal after determining the monitored rate of current change is abnormal.

22. The power converter of claim 21 wherein the coil is an inductor.

23. The power converter of claim 21 wherein the coil is a transformer winding.

24. The power converter of claim 21 wherein the allowable rate of current change is defined as a range of allowable rates of change.

25. The power converter of claim 21 wherein the controller is configured for determining the allowable rate of current change as a function of one or more operating conditions of the power converter.

26. The power converter of claim 21 wherein the controller is configured for providing the fault signal to a system hosting the power converter.

27. The power converter of 26 wherein the controller is configured for shutting down the power converter in response to a command from the system hosting the power converter.

28. The power converter of claim 21 wherein the controller is configured for shutting down the power converter after generating the fault signal.

29. The power converter of claim 21 wherein the controller is further configured for monitoring the rate of change of each of a plurality of operating parameters, comparing the monitored rate of change of each operating parameter with an allowable rate of change for such operating parameter, and generating a fault signal when one or more of the monitored rates of change deviates from its allowable rate of change.

30. The power converter of claim 29 wherein the plurality of operating parameters are selected from the group consisting of temperatures, currents and voltages.

* * * * *